United States Patent [19]
Kobold

[11] Patent Number: 6,119,524
[45] Date of Patent: Sep. 19, 2000

[54] MEASURING INDICATOR DEVICE

[76] Inventor: Klaus Kobold, Kuipersstraat 7, B-2000 Antwerp, Belgium

[21] Appl. No.: 09/272,210

[22] Filed: Mar. 19, 1999

[30] Foreign Application Priority Data

Mar. 19, 1998 [DE] Germany .......................... 198 11 970

[51] Int. Cl.⁷ ............................... G01L 9/06; G01L 9/12; G01L 7/00
[52] U.S. Cl. .................. 73/727; 73/724; 73/756
[58] Field of Search ................ 73/706, 723, 731, 73/738, 756, 708, 146.3, 146.4, 146.8, 714, 716, 724, 727

[56] References Cited

U.S. PATENT DOCUMENTS

| | | | |
|---|---|---|---|
| 3,960,018 | 6/1976 | Change et al. | 73/398 R |
| 4,250,759 | 2/1981 | Vago et al. | 73/723 |
| 4,723,445 | 2/1988 | Ripley et al. | 73/146.3 |
| 4,748,845 | 6/1988 | Rocco et al. | 73/146.8 |
| 5,070,732 | 12/1991 | Duncan et al. | 73/431 |
| 5,313,839 | 5/1994 | Ridenour | 73/756 |
| 5,331,857 | 7/1994 | Levine et al. | 73/756 |

FOREIGN PATENT DOCUMENTS

| | | |
|---|---|---|
| 27 55 354 | 6/1979 | Germany . |
| 38 05 815 | 9/1989 | Germany . |
| 38 09 142 | 10/1989 | Germany . |
| 39 33 689 | 4/1991 | Germany . |
| 91 09 1764 | 10/1991 | Germany . |
| 41 20 752 | 1/1993 | Germany . |
| 92 12 8327 | 3/1994 | Germany . |
| 42 33 315 | 4/1994 | Germany . |
| 88 17 2139 | 8/1994 | Germany . |
| 43 35 732 | 4/1995 | Germany . |
| 295 11 976 U | 11/1995 | Germany . |
| 196 16 658 | 9/1997 | Germany . |

*Primary Examiner*—Benjamin R. Fuller
*Assistant Examiner*—Abdullahi Aw-Musse
*Attorney, Agent, or Firm*—Wenderoth, Lind & Ponack, L.L.P.

[57] ABSTRACT

The invention relates to a measuring indicator device comprising a modular pressure transducer, a modular line socket connected to a device connector and a modular casing having a display. In order to improve the usefulness and provide simultaneous simple assembly, the pressure transducer and the device connector with the line socket are connected to opposing sides of the casing so that the casing is capable of rotating about its longitudinal axis.

16 Claims, 4 Drawing Sheets

MEASURING INDICATOR DEVICE

The invention relates to a measuring indicator device with a pressure transducer, a first device connector, a line socket connected to it, and a casing for receiving a display.

Such a measuring indicator device is known. If can be implemented, for example, such that no auxiliary energy is necessary for its operation. In it is provided, for example, an LCD indicator in a casing connected laterally to an intermediate piece, which connects the pressure transducer with the device connector onto which can be placed a line socket. This design has a relatively high space requirement and, in special installation situations, is difficult to read.

It is the task of the present invention to create a measuring indicator device of the above cited type which is more compact and yet readily readable.

This task is solved according to the invention for example thereby that the pressure transducer and the device connector with the line socket are sandwich-like connected on opposing sides of the casing.

Casing, pressure transducer and device connector with line socket are therein connectd, for example via plug-in and/or screw connections, so as to be electrically and mechanically detachable so that in an extremely simple manner the measuring indicator device according to the invention can also be retroactively installed into existing systems in the case of all commercially available sensors.

The casing can be disposed rotatably about its longitudinal axis relative to the pressure transducer and, potentially, also relative to the line socket, whereby as an additional advantage the indicator can always be read from the front regardless of the position of the pressure transducer.

Simple assembly is possible if the casing can be screwed by means of central screws onto a further device connector of the pressure transducer.

In this case the line socket can also be connected via the first device connector with the casing by means of the central screw.

For this purpose, the casing can be fastened so as to be axially rotatable via a grip ring on the pressure transducer.

The casing can also receive the electronic system associated with the display.

A further advantage of the invention is attained if the display is disposed transversely or parallel to the longitudinal axis of the casing since in this case different installation positions of the display can be realized in especially simple manner.

In different embodiments of the invention the display can be implemented as LCD, LED or as an analog indicator.

A front covering, or cover, is preferably disposed on the casing so as to be detachable, whereby a simple calibration of the measuring indicator device, for example by means of zero and final point setting, can take place via the buttons disposed on an electronics circuit board.

But in the casing of the measuring indicator device closable openings can also be provided, through which a simple calibration of the measuring indicator device can take place, for example by means of zero point and measuring range setting.

With the invention is furthermore proposed that the diameter of the casing, comprising for example synthetic material and having, for example, the form of a cube, does not substantially exceed the diameter of the pressure transducer, i.e. by no more than 20%, preferably by no more than 10%, such that high compactness is attained. In particular, the casing should not be larger than 42×42×48 mm.

Further goals, characteristics, advantages and possibilities of application of the invention are evident in the following description as well as the drawings. Therein all described and/or graphically depicted characteristics by themselves or in any meaningful combination form the subject matter of the present invention, even independently of their summary in the claims or their reference back.

IN THE DRAWINGS

Figure 1:
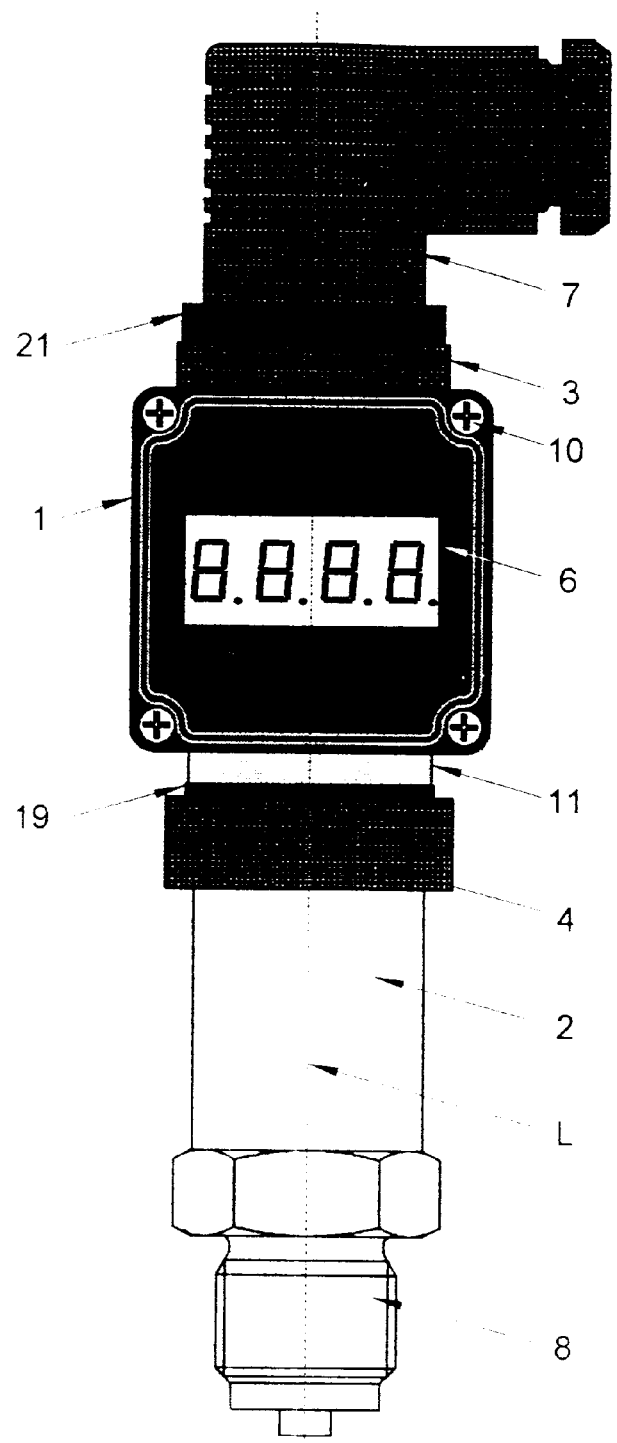
FIG. 1 is a front view of a measuring indicator device according to one embodiment of the invention.

The measuring indicator device 1 depicted in the drawings comprises a pressure transducer 2 with a cylindrical sleeve. In such pressure transducers the pressure measurement takes place, for example with the aid of an inner diaphragm wherein through a piezoresistive sensor element in thin-film technique the measuring transducing proper takes place. However, the invention is not limited to measuring transducers of this specific constructional type. The pressure transducer 2 is rotatably and detachably disposed on a device connector 18 disposed on one side of a casing 5 by means of a grip ring 4 formed as a plastic screw nut. An O-ring 20 ensures the sealing between pressure transducer 2 and device connector 18. At the end facing away from the casing 5 the pressure transducer 2 bears a screwed-on process connector 8 via which the connection with a line can be established, whose pressure is to be monitored.

On one side of the casing 5 (diametrically opposite the pressure transducer 2) is disposed a device connector 3 with a line socket 7 to which a cable with the electric lines for the power supply as well as the signal transmission to an evaluation circuit can be connected. Casing 5 accordingly is disposed sandwich-like between the pressure transducer 2 and the line socket 7. By means of a detachable central screw 13, a mechanical connection is established between the casing 5, the pressure transducer 2, and the line socket 7. For this purpose, the central screw 13 extends through the line socket 7, the device connector 3 and the casing 5 into threads of the device connector 18. The casing 5 comprises, for example, synthetic material and has the form of a cube. On its end facing the pressure transducer 2, the casing 5 has a cylindrical collar extension 11 for the concentric reception of the inner portion 15 of the line socket 7. The inner portion 15 of the line socket 7 is affixed in the casing 5 by adhesion with reinforcement ribs 14. The device connector 3 is supported in its central region on the inner portion 15 via a spacer sleeve 23 received on the central screw 13.

On the front side of casing 5, a front covering, or cover 9, is attached by means of screws 10. In the center of the front covering 9 is a transparent window 12, below which is disposed a display 6 with a, for example, 4-digit LED display. The associated electronics in the form of a circuit board 16 is also disposed in the casing 5. In the center of the top side of casing 5, the device connector 3 is welded on with the aid of ultrasound. The, for example, cubic line socket 7 is mounted on the device connector 3 by means of the central screw 13.

Due to the device connector 3 welded onto the top side, as well as the collar extension 11 disposed on the bottom side with the inner portion of the line socket 7, the entire casing 5 forms a type of device connector according to DIN 43650, which can be screwed to the pressure transducer 2. The casing 5 additionally comprises an integrated display 6. The rotatable support of the device connector 3 with the line socket 7, or of the pressure transducer 2 on the casing 5 permits rotating the housing 5 about its longitudinal axis L and, thus, also about the longitudinal axes of pressure transducer 2, device connector 3 and line socket 7. Consequently, swivelling the display 6 into any desired reading position is possible.

The described connections are implemented so as to be splash-proof such that all required degrees of protection can be attained. This is accomplished, for example, by means of a flat sealing ring 19 between device connector 18 and casing 5 and a profile washer 21 between line socket 7 and device connector 3. Mounting the described embodiment on a pressure transducer 2 can take place without having to open the casing 5.

In another embodiment of the invention, slit-form openings are disposed in the bottom of casing 5 for leading through the pins of the device connector for the pressure transducer 2, as well as a bore for the central screw 13. Casing 5 in this case is screwed together with the device connector 18 of the pressure transducer 2, with connection terminals being placed onto the pins. The lower casing portion in this embodiment represents a line socket and the connection on the cover represents a device connector.

Casing 5 is preferably produced of synthetic material injection moulding with the front covering, or cover 9, being screwed on splash-proof via four screws 10 and a seal 22. For setting the measuring range and the limit contact, the front covering, or cover 9, must be unscrewed. Using the buttons 17 on the electronics circuit board 16 underneath it, the setting of zero and end point as well as of the display delay must be carried out. Furthermore, in the case of the limit contact setting, the setting of the switching point, switching direction and switching delay is possible. The buttons 17 can also be actuatable via closable openings 24 in the front covering 9.

Figure 2:
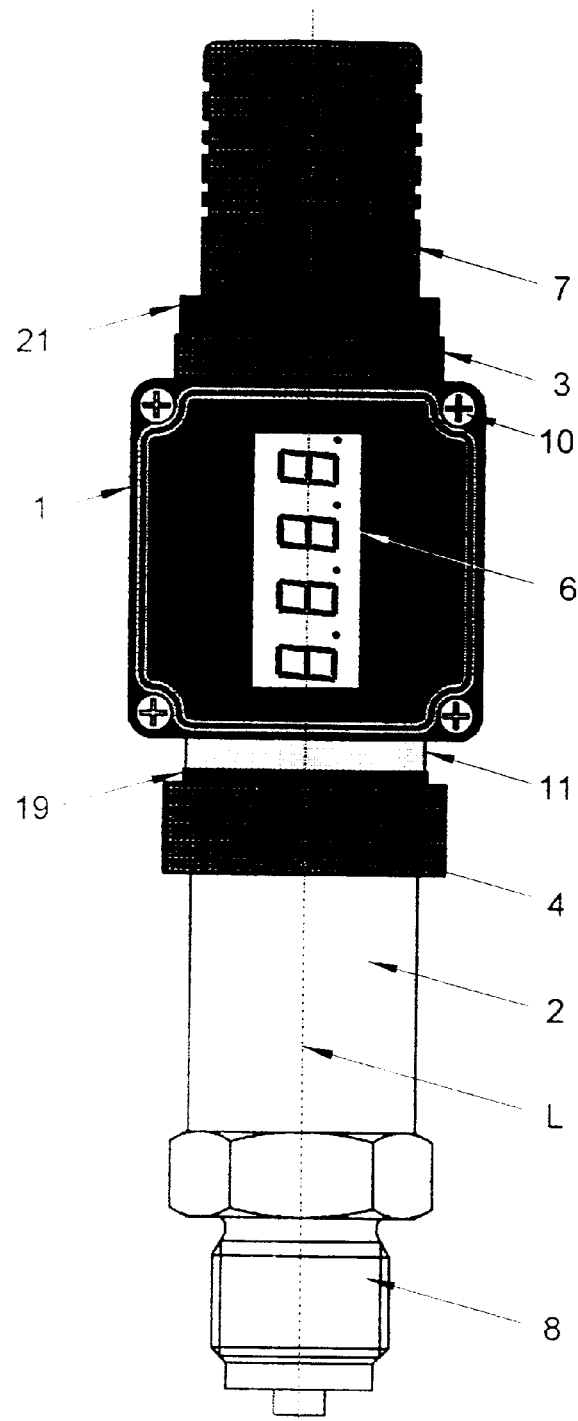
FIG. 2 is a front view showing another embodiment of the invention.
Figure 3:
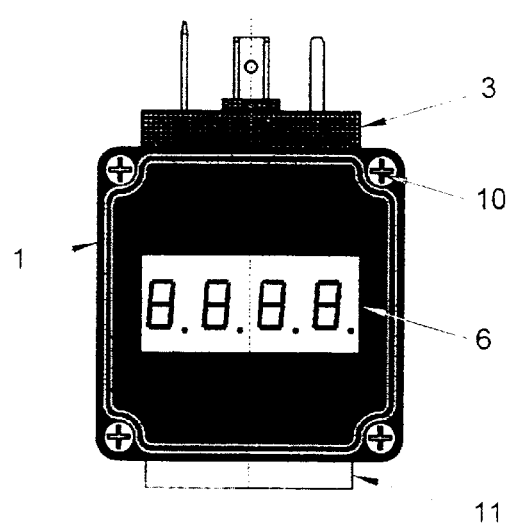
FIG. 3 is a front view of the measuring indicator device according to FIG. 1, shown without a pressure transducer and a line socket.
Figure 4:
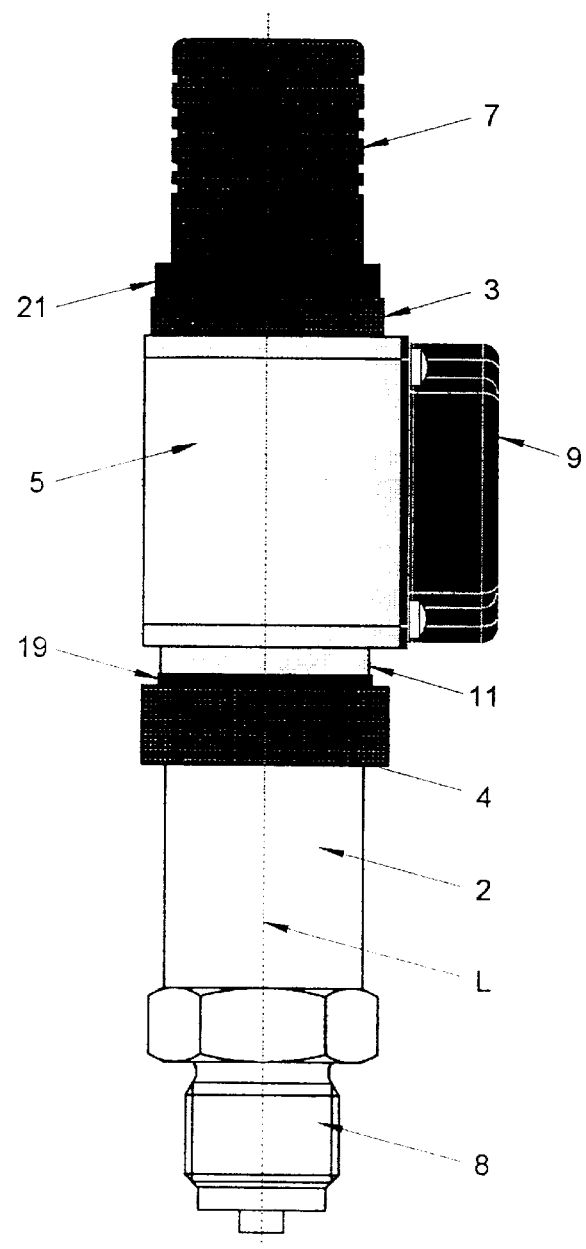
FIG. 4 is a side view of the measuring indicator device according to FIG. 1.
Figure 5:
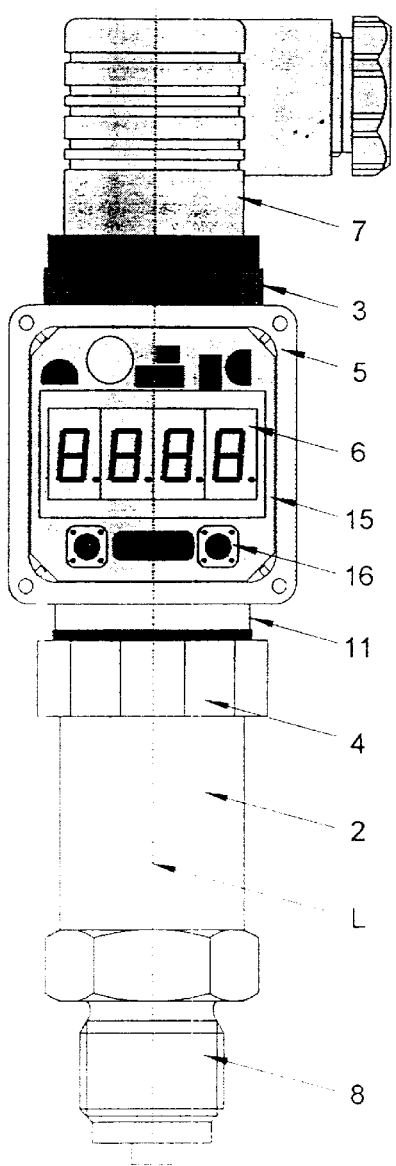
FIG. 5 is a front view of the measuring indicator device according to FIG. 1, with the front covering of the casing removed.
Figure 6:
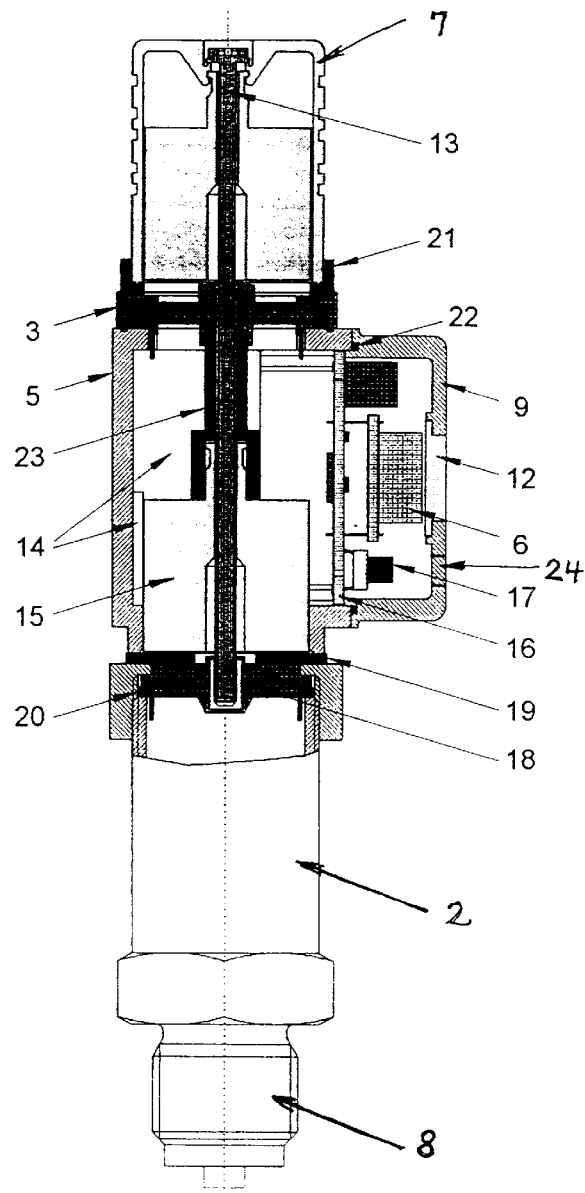
FIG. 6 is a longitudinal section of the measuring indicator device according to FIG. 1.

FIG. 2 shows an arrangement according to the invention in which, in contrast to that shown in FIG. 1, the display 6 is disposed parallel to the longitudinal axis L. This permits taking into account different installation positions of the measuring indicator device 1 without disadvantages being encountered in the readability of the indicator.

The measuring indicator device 1, due to the use of an auxiliary energy-free display is preferably operatable without auxiliary energy. Basically, as display 6 are usable LCD, LED or also analog indicator elements, such as for example needles.

I claim:

1. A measuring indicator device comprising:
   a modular pressure transducer;
   a modular line socket;
   a modular casing having a display, a longitudinal axis, a first end, and a second end opposite said first end and rotatably connected to said pressure transducer such that said casing is capable of rotating about said longitudinal axis with respect to said pressure transducer; and
   a modular first connector for connecting said first end of said casing to said line socket.

2. The device of claim 1, wherein said first end of said casing is rotatably connected to said line socket such that said casing is capable of rotating about said longitudinal axis with respect to said line socket.

3. The device of claim 2, further comprising a second connector for rotatably connecting said second end of said casing to said pressure transducer, and a central screw connecting said casing to said second connector.

4. The device of claim 2, further comprising a grip ring for rotatably connecting said second end of said casing to said pressure transducer.

5. The device of claim 1, further comprising a second connector for rotatably connecting said second end of said casing to said pressure transducer, and a central screw connecting said casing to said second connector.

6. The device of claim 5, wherein said central screw connects said first connector to said casing.

7. The device of claim 6, further comprising a grip ring for rotatably connecting said second end of said casing to said pressure transducer.

8. The device of claim 5, further comprising a grip ring for rotatably connecting said second end of said casing to said pressure transducer.

9. The device of claim 1, further comprising a grip ring for rotatably connecting said second end of said casing to said pressure transducer.

10. The device of claim 1, wherein said casing includes electronic components connected to said display.

11. The device of claim 1, wherein said display is arranged in one of a parallel position and a transverse position relative to said longitudinal axis.

12. The device of claim 1, wherein said display comprises one of an LCD, an LED, and an analog indicator.

13. The device of claim 1, wherein said casing includes an electronic circuit board connected to calibration buttons for calibrating the measuring indicator device, and a removable cover for enclosing said electronic circuit board and calibration buttons.

14. The device of claim 1, wherein said casing includes closable access openings for calibrating the measuring indicator device.

15. The device of claim 1, wherein said casing has a casing diameter and said pressure transducer has a pressure transducer diameter, said casing diameter being no larger than 1.2 times said pressure transducer diameter.

16. The device of claim 1, wherein said casing comprises synthetic material and is no larger than 42×42×48 mm.

* * * * *